Dec. 24, 1957 J. E. ALBRIGHT 2,817,824

CARD SWITCHING DEVICE

Filed Nov. 21, 1952 2 Sheets-Sheet 1

INVENTOR.

JAMES E. ALBRIGHT

BY [signature]

ATTORNEY

Dec. 24, 1957 J. E. ALBRIGHT 2,817,824

CARD SWITCHING DEVICE

Filed Nov. 21, 1952 2 Sheets-Sheet 2

INVENTOR.

JAMES E ALBRIGHT

BY [signature]

ATTORNEY 2,817,824

CARD SWITCHING DEVICE

James E. Albright, Collingswood, N. J., assignor to Radio Corporation of America, a corporation of Delaware Application November 21, 1952, Serial No. 321,921
6 Claims. (Cl. 339—18)

The present invention relates to improvements in card record devices of the general type employed in statistical machine control.

In more particularity, although not necessarily exclusively, the present invention relates to improvements in the fabrication and structure of a card type electro-mechanical storage device such that the card storage device embraces an element of secrecy whereby the information carried, stored, or contained by the card record is available only by specialized processing in connection with specific forms of equipment.

The prior art contains many examples of card storage devices such as are used in specialized machines for counting, tabulating, sorting or otherwise specially treating the data contents of various record sheets and documents by electro-mechanical means. It has been taught that such cards may embrace a plurality of precisely spaced holes, areas of electrical conductivity or higher magnetic permeability, optical tracks of predetermined patterns, notched edges, etc., for recording sales records, examination papers, ballots, census reports, etc. Once information is placed upon these cards by the various techniques suggested, they may be inserted or fed into specialized machines which will analyze and read off the desired information or answer.

Many of the prior art card record fabricating techniques have, however, resulted in a card record which bears plainly visible evidence of the nature of the recorded material stored thereon, once the general system or method of recording the information becomes known. In most instances, such card records have been satisfactory since the type of information recorded by such cards was not normally of much interest or value to persons other than those permitted direct access to the card. Or, if general access to the card was obtainable, information represented by the indicia borne by the card was generally of insufficient value to warrant an outsider acquainting himself witn the complexities of the recording system in order to interpret the information.

In the field of electrical communication, where a degree of communication security is often desirable, numerous systems have been proposed in which statistical garbling of the communication channel is carried on through frequency inversion, extraneous signal impregnation, electrical code group inversion, etc. In order for a receiving location to utilize such a garbled transmission, it is necessary that the receiving location be fully apprised of the manner in which desired information has been garbled. One convenient way of providing a receiving location with the necessary degarbling information may be in the form of a card record of the above-discussed electro-mechanical storage type. Key control cards may then be assigned to each garbled transmission such that successful communication over a garbled communication channel can be realized only when both transmitter and receiving location garbling and degarbling procedures are controlled by a predetermined type of key card. In such a system it becomes evident that any given garbled transmission has no more security than the security of the key cards assigned to the transmission.

Accordingly, in subscriber type television systems in which degarbling of a centrally broadcast subscriber television signal is to be accomplished through the use of a card record, copies of which are distributed only to paid subscribers, the card record must necessarily be of a type discouraging easy and speedy reproduction by unauthorized individuals. The control card must further be of a nature which prevents its construction and stored information from being gleaned by mere superficial examination and ideally should resist any attempt at detecting or determining the information stored in, on, or by the card by unauthorized persons.

It is, therefore, an object of the present invention to provide an improved form of record bearing card of the type suitable for electro-mechanical control of an apparatus.

It is further an object of the present invention to provide an improved form of electro-mechanical type record bearing card which embraces a high degree of security against unauthorized reproduction or utilization.

It is still a further object of the present invention to provide an improved form of record bearing card suitable for use as a key control card in subscriber television system.

It is yet another object of the present invention to provide a key control card for use by subscribers to a paid television system which will enable the subscriber holding the card to successfully view television broadcasts which otherwise appear garbled to receivers not provided with a key card.

It is another object of the present invention to provide a subscriber type television key control card which is difficult to counterfeit or superficially analyze to the extent of permitting the indicia it bears to be usefully employed.

In the realization of the above objects one of the more general forms of the present invention involves the construction of a key control card having a plurality of electrical contact areas established on the face of the card or available through openings in the face of the card. Electrical circuits are then established between the contact areas by hidden conductive deposits within the card. The circuit paths within the card may be made circuitous in nature so as to depend for their continuity upon the presence of predetermined control sections of the card defined by visual indicia on the surface of the card. By removing, separating, parting, severing or destroying predetermined control sections of the control card, an alteration may be made in the circuit connections between the various contact areas whereby to produce predetermined functions in devices depending upon the circuitry of the card for operational control.

A better understanding of the present invention, its method of operation and other objects and features of advantage will be forthcoming from a reading of the following specification, especially when taken in connection with the accompanying drawings, in which Figure 1 is a combination block and diagrammatic representation of a communication garbling system in which the present invention finds application as a garbling control means.

Figures 1, 2, 3:
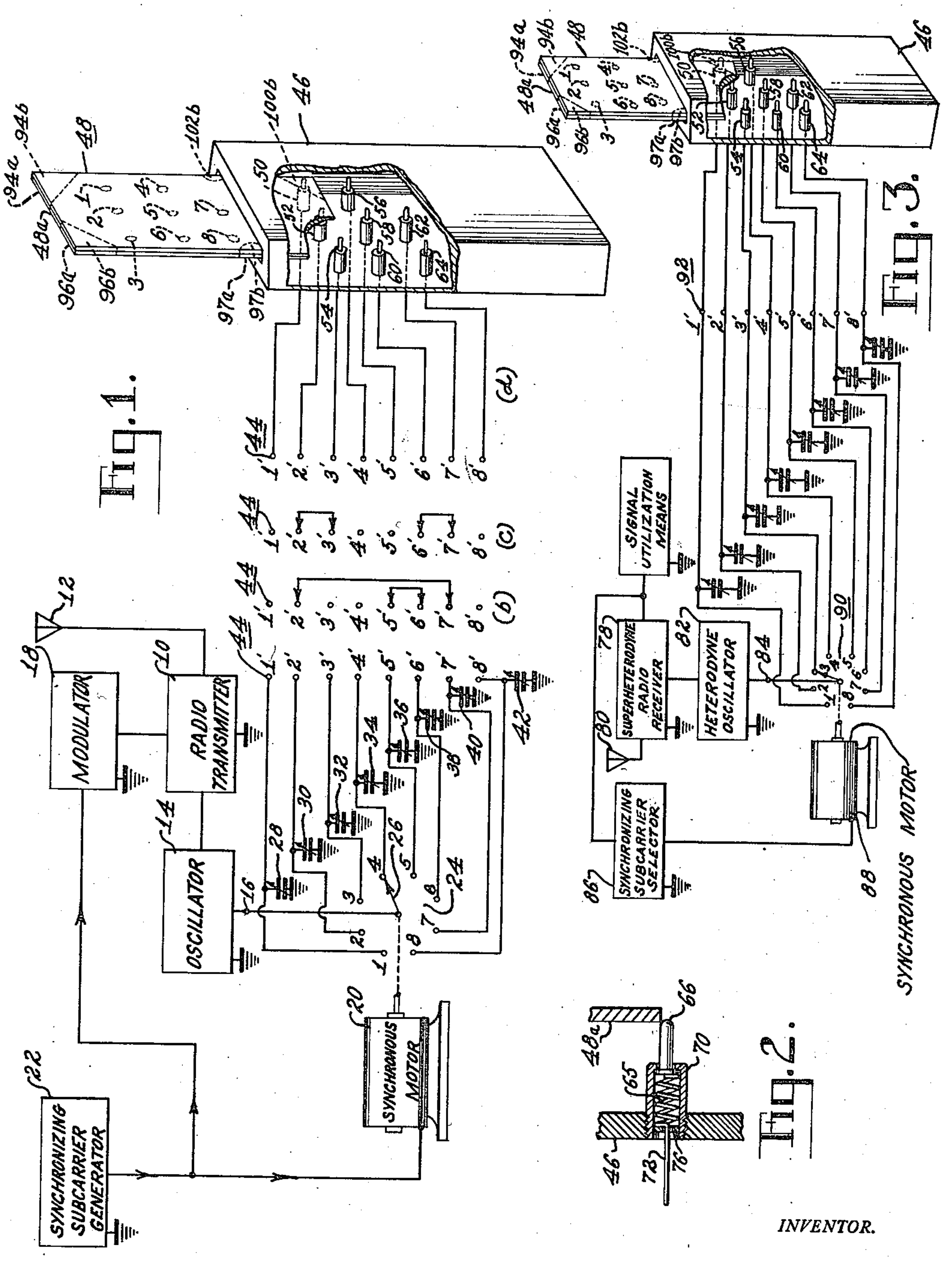
Figure 2 is a sectional view of a portion of a card contacting arrangement illustrated more fully in Figure 3.
Figure 3 is a combination block and diagrammatic representation of a communication receiving system adapted to successfully receive garbled communication signals under the control of a key card or card information storage device constructed in accordance with the present invention.

In order to better understand the novel features of the present invention it is best to consider its application to an instrumentality having one or more characteristics suited to control by information of a type that may be recorded or stored by a key card. Such an arrangement is illustrated in Figure 1 in which a radio transmitter 10 is connected with the radio antenna 12 for transmission of a radio communication signal. The frequency of the radio transmitter 10 is determined by an oscillator 14 whose frequency may be shifted by means of applying various values of capacity to a frequency control terminal 16. The oscillator 14 may take the form of a simple Colpits oscillator with frequency control terminal 16 being connected across the resonant circuit of the Colpits oscillator. A modulator 18 is connected with the transmitter 10 for imposing one or more forms of signal modulation upon the transmitted radio carrier.

In order to provide secrecy in signal transmission, the frequency of the oscillator 14 is caused to change periodically by means of a synchronous motor 20. The motor 20 is driven by the output of a synchronizing sub-carrier generator 22 whose output is also applied to the modulator 18 so that frequency changing synchronizing information may be also transmitted to a receiver location. It is understood that in practice the synchronizing sub-carrier as applied to the modulator 18 will merely supplement other forms of modulation which carry the intelligence to be communicated. For example, the modulator 18 may be of the television signal variety capable of simultaneous modulation of the radio carrier with both sound and video information as described in an article entitled "Transmission of television sound on the picture carrier," by G. L. Faedenall, Proceedings of the IRE for February 1946.

The synchronous motor 20 in Figure 1 is mechanically coupled with a switch arrangement 24 having a moveable armature 26 adapted to contact a plurality of contacts 1 through 8. Each contact has associated with it a capacitor which may be of either the fixed or variable type. Capacitors 28, 30, 32, 34, 36, 38, 40, and 42 are illustrated as respectively connected to contacts 1 through 8. If then a connection terminal bank such as shown at 44 is provided for terminals 1' through 8' (corresponding to the terminals 1 through 8 of switch 24) the pattern of frequency change caused by the synchronous modulator 20 may be made to vary by providing different modes of interconnection between the various terminals 1' through 8'. For example, as shown at the terminal board 44 terminals 1' and 5' are connected and terminals 2' and 3' are connected. This will cause the capacity presented to terminals 1 and 5 of the switch 24 to represent the sum of capacitors 28 and 36. Correspondingly, the capacity presented at terminals 2 and 3 will be the sum of capacitors 20 and 32. Each of the variable capacitors 28 through 42 may be provided with an index setting which may be changed for different series of broadcasts.

In Figure 1 at "*b*" there is shown another terminal board connection arrangement 44'. Here terminals 2' and 7' are connected and terminals 5' and 6' are connected. This provides a different frequency change pattern for a given rotation of the switch 24 since now the capacity available at terminals 2 and 7 will be the sum of capacitors 30 and 40, while the capacity applied at terminals 5 and 6 will be the sum of capacitors 36 and 38.

In Figure 1 at "*c*" there is shown still another connection for the terminal board 44''. The connections at the terminal board 44 may, of course, be made by well-known switching mechanisms or by patching cord techniques. On the other hand, the necessary connections may be accomplished by a card record of the electro-mechanical type to which the present invention is in main directed.

Such an arrangement for determining the connections between the terminals 1' through 8' of the terminal board 44'' is shown at "*d*." A card record holder and analyzer 46 is provided for accepting and receiving a laminated record or key card 48. Spring actuated pressure contactors 50, 52, 54, 56, 58, 60, 62, and 64 are applied against the surface of the control card 48 as it is inserted and held by the holder 46. Thus, any conductive paths provided by the control card 58 between areas thereon corresponding to the position of the contactors 50 through 64, provide a "set-up" for the frequency changes pattern produced by the synchronous motor 20.

Figure 2 is a sectional view of one type of spring actuated pressure contactor which may be employed as shown at "*d*" in Figure 1. The pin 66 of the contactor is urged outwardly by the spring 68 contained by the housing 70. Spring 68 is electrically connected to the pin 66 so that the left hand extremity of the spring 68 may be connected to a wire 72 extending through the insulating block 76. The wire 72 may be applied to one of the terminals 1' through 8'.

A receiving arrangement which is complementary in nature to the transmission system of Figure 1 is illustrated in Figure 3. Here a superheterodyne radio receiver 78 is provided with received radio signals from the radio antenna 80. The local oscillator for the superheterodyne receiver 78 is shown separated from the block 78 at 82. A frequency change terminal 84 is provided for the oscillator 82 in a manner similar to the frequency control terminal 16 for the oscillator 14 of Figure 1. The synchronizing sub-carrier generated by the generator 22 in Figure 1 is detected by the sub-carrier detector 86 connected with the output of the superheterodyne radio receiver 78. The demodulated sub-carrier is then applied to a synchronous motor 88 which in turn drives a frequency changing switch 90. The action of the switch 90 is the counterpart of the switch 24 in Figure 1 described above. Depending upon the connections between the terminals 1' through 8' at terminal bank 92 of the receiver, the tuning of the superheterodyne receiver 78 may be made to agree with the pattern of frequency change produced in the transmitter. The necessary connections between terminals 1' through 8' at the terminal board 92 may be established by another multi-layer or laminated card 48 having a holder 56 exactly the same as that shown in Figure 1.

The manner in which the laminated card 48 may be made to determine desirable connections between the frequency change terminals described above is illustrated in Figure 4.

Figure 4:
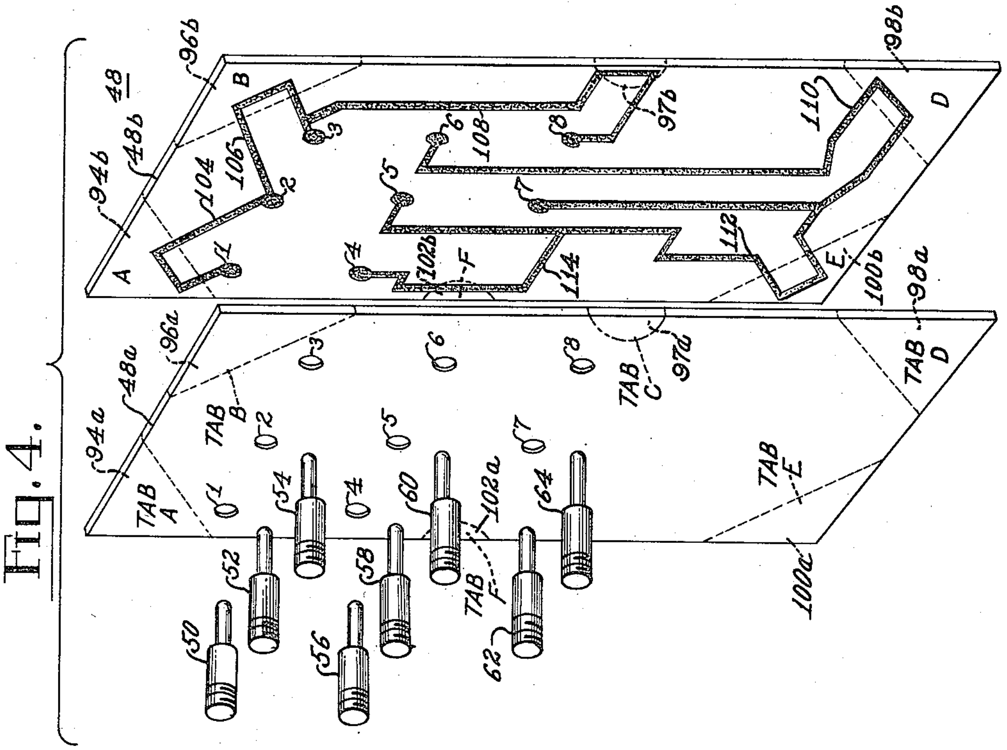
Figure 4 is an exploded elevational view of the laminations comprising one form of card made in accordance with the present invention.
Figure 5:
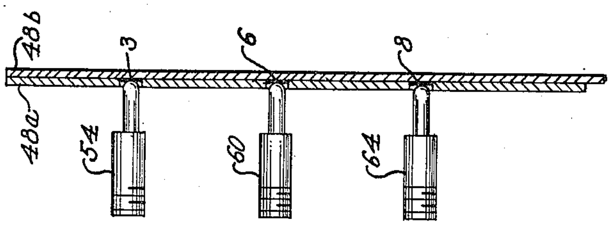
Figure 5 is a magnified sectional view of a laminated card constructed in accordance with the present invention as illustrated in Figure 4.

In accordance with the present invention the card 48 may be made up of a plurality of lamination sheets such as **48*a* and 48*b*. Contactors 50 through 64 are illustrated in their relation to the card as it is held by the holder 46** in Figure 1. For those terminal connections shown in "*c*" of Figure 1 the card 40 may be made up as illustrated in Figure 4. It will be seen that the contactors 50 through 64 are disposed to contact terminii of conductive paths 104 through 114 described on the surface of lamination **48*b* through the holes in the lamination of 48*a*. For purposes of illustrational convenience, the holes in the lamination 48*a* and the circuit path terminii on lamination 48*b* have been given numerical designations corresponding to the terminal board numbers (shown in Figure 1) 1 through 8. Hence, pressure contactor 50 will act through hole 1 in lamination 48*b* to contact terminal 1 on the printed circuit or conductive path deposit of lamination 48*b*. Correspondingly, pressure contactors 54, 60, and 64 act through holes 3, 6, and 8 in lamination 48*a* to contact terminii on lamination 48*b*. This is shown in more detail in Figure 5. It will be seen that in accordance with the present the circuit paths which connect the various terminii 1 through 8 on the lamination 48*b*** are rather circuitous in nature and extend to extremities and positions on the card in what might be considered in the prior art as a rather unorthodox fashion.

In further accordance with the present invention the card 48 is provided with a plurality of removable sections such as indicated at 94*a*, 96*a*, 97*a*, 98*a*, 100*a* and 102*a* on lamination 48*a*. These sections are the counterpart of sections 94*b*, 96*b*, 97*b*, 98*b*, 100*b* and 102*b* of lamination 48*b*. Dotted line indicia describe these areas which will be hereinafter termed control areas. The dotted line designations may also indicate perforations so that when the laminations 48*a* and 48*b* are mounted together to form a single card the control sections 94 through 102 may be easily removed by the fingers of a human hand. By way of illustration, the control areas 94*a* have been described more generally as Tab A, Tab B, Tab C, Tab D, Tab E, and Tab F, respectively, so that each control area may be easily identified.

The conductive circuit paths such as 104, 106, 108, 110, 112, and 114, respectively, pass through the control areas or Tabs A, B, C, D, E and such constitutes a novel feature of the present invention.

The circuit paths themselves may be photographically, mechanically or otherwise described between the contact terminals 1 through 8. However, it will be seen that removal of any one or more of the control areas described by Tabs A through E will alter the circuit connections between the contactors 50 through 64 when the card is placed in the holder 56 (Figure 1). Thus, in order to provide the terminal connections indicated in Figure 1*c*, it will be necessary to remove Tabs A, C, E, and F. Removal of these tabs will interrupt circuit paths 104, 118, 112, and 114 and leave intact circuit paths 106 and 110. There will then remain continuity only between contactors 42 and 54 and continuity between contactors 60 and 62. These contactors correspond to terminal positions 2 and 3 and terminal positions 6 and 7, in Figure 1*c*.

It will be appreciated that in order to accomplish the interruption of hidden circuits within the card the complete removal of a given area of the card is not necessary. Interruption of a circuit path may be made simply by cutting the card with a knife or scissors so as to leave in the card only a gash or incision. Moreover, interruption of the circuit paths within the card may be accomplished by punching out certain sections of the card through which the hidden circuit paths may pass. On the other hand the designations of areas to be punched out, removed, or cut may not be visually indicated on the surface of the card, but may rest upon secret knowledge known only to certain intended users of the card.

The manner in which a card constructed in accordance with the present invention may be made to serve as a secrecy element or "key" in a subscriber television system immediately suggests itself. The card with no control area removed could be sold on a subscription basis to individuals desiring to view predetermined television broadcasts. Prior to the broadcast the user could be advised to remove Tabs A, C, E, and F before inserting the card into the card holder. The information as to the tabs to be removed could be given to the subscriber on a confidential publication basis, via the telephone, or over a radio sound channel.

It is contemplated in the practice of the present invention that the laminations comprising the card will be so rigidly fastened to one another as to discourage counterfeiting the card. That is to say should one desire to counterfeit the card it would be necessary for that person to know exactly the manner in which circuit paths pass through particular control areas or tabs. In order to determine this, it would be necessary to dissect the card. If the laminations are firmly fastened to one another, it will make it virtually impossible to investigate the structure of the card without completely destroying the evidence necessary to determine the circuit arrangement.

The novel record card of the present invention is, of course, no way limited to use as a key in radio communication secrecy systems. A control card constructed in accordance with the present invention can take a variety of forms and may find application as indicated hereinabove as control elements in business or calculating machines. Data can be stored on the card through merely punching the card at predetermined areas so as to interrupt predetermined circuits within the card and therefore change the effective terminal connections between card contactors which are adapted to control the operation of a suitable utilization means.

What is claimed is:

1. In a data storage device of the card type, the combination of: a plurality of insulating sheets fastened together in card form at least one of said outside sheets having extending through it at least two openings through which electrical contacts may pass; a conductive path on the surface immediately adjacent to said last named sheet such that said two openings permit access to said conductive path, said conductive path on the surface of said sheet extending through a section of the card designated for conditional removal whereby conditional removal of that section of the card will interrupt said conductive path.

2. In a control card for electrical communication techniques comprising the combination of a plurality of laminations fastened together to form a card, said laminations being of substantially non-conductive material, at least one of the laminations forming the outside surface of said card having designated thereon a control area to be conditionally removed, one of said laminations having on the unexposed surface thereof an electrically conductive circuit path connecting at least two positions on said lamination, said circuit path extending through an area corresponding to said control area designation on the outer surface of said card, electrical contacting means permitting access to said conductive paths through at least one of said laminations whereby the continuity of said conductive path may be interrupted through the removal of said control area.

3. In a data storage card of the type employed to control electrical connections extreme to itself and coupled to said card through a plurality of continuity sensing electrodes applied to said card, the combination of: a plurality of conductive circuit path deposits contained within said card with access areas on the surface of said card permitting the sensing of said conductive circuit paths by said continuity sensing electrodes, a plurality of conductive deposits serially interspersed in said conductive paths upon which said conductive paths depend for continuity, and visual designations on the outer surface of said card for locating said conductive deposits whereby said conductive deposits may be conditionally removed by removing a portion of said card thereby to modify the continuity of conductive paths within said card.

4. Apparatus according to claim 3 wherein said conductive deposits are so situated relative to the outer extremities of said card as to allow their interruption by incision of the card material.

5. In a data storage device for containing electrical signal information comprising: a card member of substantially nonconductive material having one face thereof provided with a plurality of contact areas by means of which contact may be made with electrical circuitry held by said card, a plurality of primary conductive deposits in substantially strip form held by said card and each in contact with respectively different contact areas, a plurality of secondary conductive deposits held by said card at given control areas thereon and conductively coupling predetermined strips of said primary conductive deposits whereby removal of predetermined sections of said card at said given control areas will interrupt the continuity between predetermined contact areas in a predetermined manner.

6. In a data storage device, the combination of: a card element having a plurality of contacting areas designated thereon by means of which external electrically conductive connection to said areas may be made, electrically conductive circuit paths between said contacting areas, said paths being formed by conductive material held by said card, and visible designations on the surface of said card indicative of areas of card holding said conductive material whereby removal of said areas will alter the circuit paths between said contacting areas.

References Cited in the file of this patent

UNITED STATES PATENTS

| | | |
|---|---|---|
| 1,739,087 | Perkins | Dec. 10, 1929 |
| 1,760,417 | Lake | May 27, 1930 |
| 2,353,061 | Oldenboom | July 4, 1944 |
| 2,484,642 | Paris | Oct. 11, 1949 |
| 2,536,155 | Brand | Jan. 2, 1951 |
| 2,586,710 | Pick | Feb. 19, 1952 |

FOREIGN PATENTS

| | | |
|---|---|---|
| 555,150 | Germany | Aug. 23, 1932 |